(12) United States Patent
Liu

(10) Patent No.: US 6,369,699 B1
(45) Date of Patent: Apr. 9, 2002

(54) SINGLE-CABLE TRANSMISSION DEVICE FOR SIGNALS AND POWER SUPPLY OF A SURVEILLANCE SYSTEM

(75) Inventor: Yen-Szu Liu, Taipei (TW)

(73) Assignee: Biwave Technologies, Taipei (TW)

( * ) Notice: Subject to any disclaimer, the term of this patent is extended or adjusted under 35 U.S.C. 154(b) by 0 days.

(21) Appl. No.: 09/475,113

(22) Filed: Dec. 30, 1999

(30) Foreign Application Priority Data

Dec. 31, 1998 (TW) ........................................ 87122043 A

(51) Int. Cl.[7] ............................................. H04M 11/04
(52) U.S. Cl. ................................... 340/310.01; 332/119
(58) Field of Search ..................... 340/310.01, 870.02; 332/119, 151, 102, 105; 370/271, 286, 458

(56) References Cited

U.S. PATENT DOCUMENTS

| | | | | |
|---|---|---|---|---|
| 5,949,826 A | * | 9/1999 | Iiyama et al. | 375/279 |
| 6,160,990 A | * | 12/2000 | Kobayashi et al. | 455/5.1 |
| 6,188,740 B1 | * | 2/2001 | Tomaru | 375/376 |
| 6,204,735 B1 | * | 3/2001 | Cairns | 332/119 |

* cited by examiner

Primary Examiner—John Tweel
(74) Attorney, Agent, or Firm—Bacon & Thomas

(57) ABSTRACT

The present invention provides a single-cable transmission device for signals and a power supply of a surveillance system, which only requires a single cable to transmit various signals and a power supply; which transmits signals in a carrier manner, allowing longer-distance transmission; which transmits signals in a frequency division manner, allowing bi-directional transmission. A power-supply-voltage/output-load status display is further provided, thereby facilitating a user to directly find the cause of a failure so as to eliminate the failure promptly.

52 Claims, 8 Drawing Sheets

| status | power-supply-voltage status detector | load status detector | decoded status signal output | | color of display |
|---|---|---|---|---|---|
| | A | B | G | R | |
| 1 | L | L | H | L | green |
| 2 | L | H | L | H | red |
| 3 | H | L | H | H | yellow |
| 4 | H | H | H | H | yellow |

Fig. 10

SINGLE-CABLE TRANSMISSION DEVICE FOR SIGNALS AND POWER SUPPLY OF A SURVEILLANCE SYSTEM

BACKGROUND OF THE INVENTION

The present invention relates to a transmission device for signals via cables, and more particularly to a single-cable transmission device for signals and a power supply of a surveillance system.

In current surveillance systems, taking a unidirectional surveillance system for an example, base band signals such as video signals, audio signals, control signals, etc. and a power supply between cameras at remote side and monitors at local side are typically transmitted by use of many cables (for example, coaxial cables), respectively. However, such a transmission manner has a number of defects: (1) requiring plural cables, making it difficult to install the system and thus increasing system cost; (2) requiring additional repeaters for longer-distance transmission due to gradual decrease in signal intensity under base band transmission with longer-distance transmission; (3) compounding the problems resulting from the above defects (1) and (2) when the system is to be expanded to a bi-directional one; and (4) generally not easy to directly find whether the power supply or the load (for example, the camera) is out of order when the remote side: which receives the power supply from the local side fails, even though professionals have to take advantage of proper instruments or equipment for assistance to find the cause of the failure so as to eliminate it, not to mention common consumers by DIY (Do-It-Yourself).

SUMMARY OF THE INVENTION

In view thereof, the present invention provides an improved single-cable transmission device for signals and a power supply of a surveillance system, which can solve the problems encountered by the above prior art surveillance system techniques.

One object of the present invention is to provide a transmission device, which only requires a single cable to transmit various signals and a power supply, thereby making the system installation convenient, decreasing system cost, and facilitating common consumers to use by DIY.

Another object of the present invention is to provide a transmission device, which transmits signals in a carrier manner, allowing longer-distance transmission.

Still another object of the present invention is to provide a transmission device, which transmits signals in a frequency division manner, allowing bi-directional transmission, and thus facilitating operation drills and improving friendliness with operators.

Yet another object of the present invention is to provide a transmission device, which is equipped with a power-supply-voltage/output-load status display, thereby facilitating a user to directly find the cause of a failure so as to eliminate the failure promptly, and thus saving repair time and enabling common consumers to use by DIY.

According to one embodiment of the present invention, the innovative single-cable transmission device for signals and a power supply of a surveillance system comprises a remote device, said remote device having a first modulator for transforming a first set of base band signals inputted externally into a first modulated carrier signal, and having a first filter module for receiving said first modulated carrier signal and a power supply inputted from said single cable, and for separating said first modulated carrier signal from said power supply through different frequency bands, and then outputting said separated first modulated carrier signal and power supply, respectively, wherein said outputted first modulated carrier signal is applied to said single cable.

According to another embodiment of the present invention, the innovative single-cable transmission device for signals and a power supply of a surveillance system comprises a local device, said local device having a second filter module for receiving said first modulated carrier signal inputted from said single cable and receiving a power supply inputted externally, and for separating said first modulated carrier signal from said power supply through different frequency bands, and then outputting said separated first modulated carrier signal and power supply, respectively, wherein said outputted power supply is applied to said single cable, and having a first demodulator of transforming said first modulated carrier signal outputted from said second filter module into said first set of base band signals.

According to a further embodiment of the present invention, the first filter module of the remote device of the innovative single-cable transmission device for signals and a power supply of a surveillance system further receives a second modulated carrier signal inputted from said single cable, and separates said second modulated carrier signal from said first modulated carrier signal and said power supply through different frequency bands, and then outputs said separated second modulated carrier signal; and said remote device further comprises a second demodulator for transforming said second modulated carrier signal outputted from said first filter module into a second set of base band signals.

According to another embodiment of the present invention, the local device of the innovative single-cable transmission device for signals and a power supply of a surveillance system comprises a second modulator for transforming a second set of base band signals inputted externally into a second modulated carrier signal; a second filter module for receiving said first modulated carrier signal inputted from said single cable, said second modulated carrier signal from said second modulator, and a power supply inputted externally, and for separating said first modulated carrier signal, said second modulated carrier signal, and said power supply through different frequency bands, and then outputted said separated first modulated carrier signal, second modulated carrier and power supply, respectively, wherein said outputted second modulated carrier signal and power supply are applied to said single cable; and a first demodulator for receiving said first modulated carrier signal outputted from said second filter module and transforming said first modulated carrier signals into said first set of base band signals.

According to another embodiment of the present invention, the remote device of the innovative single-cable transmission device for signals and a power supply of a surveillance system comprises a power-supply-voltage/output-load status display connected between the power supply outputted from said first filter module and external devices for detecting the operation status of the power supply voltage and the external device loads.

According to another embodiment of the present invention, the innovative single-cable transmission device for signals and a power supply of a surveillance system receives a power supply at said remote device rather than at said local device as mentioned above.

BRIEF DESCRIPTION OF THE DRAWINGS

In order to more clearly understand the above and other features and advantages of the present invention, a further description with reference to the accompanying drawings is given below, wherein:

FIG. 10 is a truth table of the status display in FIG. 9.

DETAILED DESCRIPTION OF THE PREFERRED EMBODIMENTS

Figure 1:
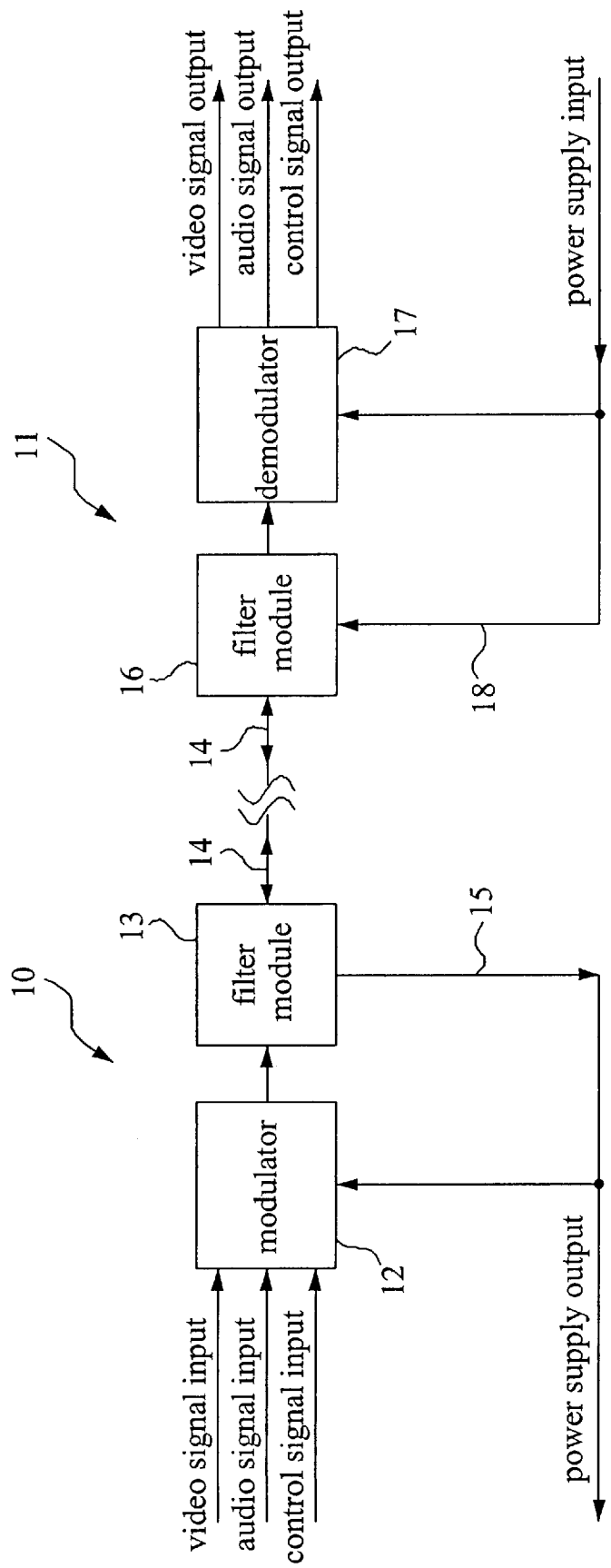
FIG. 1 is a circuit block diagram of the first preferred embodiment of the single-cable transmission device for signals and a power supply of a surveillance system according to the present invention.

In FIG. 1, there shows a circuit block diagram of the first preferred embodiment of the single-cable transmission device for signals and a power supply of a surveillance system according to the present invention, which comprises a remote device 10 and a local device 11. The remote device 10 includes a modulator 12 and a filter module 13. The modulator 12 receives a set of base band signals inputted from external devices, such as a video signal and an audio signal from a camera (not shown) and a control signal from other control devices such as a switch (not shown), and transforms said base band signals into a modulated carrier signal. The modulation can be performed in a coherent AM manner, for example. Alternatively, it is done in a non-coherent manner, and the modulator 12 is further provided with an adder to integrate modulated carrier signals.

The filter module 13 receives the modulated carrier signal outputted from the modulator 12, and a power supply from a single cable 14, and separates the modulated carrier signal from the power supply through different frequency bands, and then outputs the separated modulated carrier signal and power supply, respectively, wherein the outputted modulated carrier signal is applied to the single cable 14, and the outputted power supply is applied to the modulator 12 and external devices such as the camera, respectively, through a line 15.

The local device 11 includes a filter module 16 and a demodulator 17. The filter module 16 receives the modulated carrier signal inputted from the single cable 14, and a power supply inputted externally through line 18, and separates the modulated carrier signal from the power supply through different frequency bands, and then outputs the separated modulated carrier signal and power supply, respectively, wherein the outputted power supply is applied to the single cable 14.

The demodulator 17 receives the modulated carrier signal outputted from the filter module 16 and transforms the modulated carrier signal into the set of base band signals such as the video signal, the audio signal and the control signal. If the modulator 12 is performed in a coherent AM manner, the demodulation can be done in an AM detection manner. If the modulator 12 is performed in a non-coherent manner, the demodulation can be done with phase-locked loop (PLL). And the external power supply can be applied to the demodulator 17.

The external power supply can be a DC or AC power supply. The voltage range of the power supply varies with the length of the single cable 14. In case of an RG-59/U coaxial cable of 100 to 200 meters, tests reveal that a range of 6 to 24V DC power supplies can be applied. Instead, an AC power supply with similar voltages and a frequency less than 800 Hz can be used. Upon using an AC power supply, the power supply outputted from the filter module 13 through line 15 is rectified and then applied to the modulator 12 and external devices, respectively.

Figure 2:
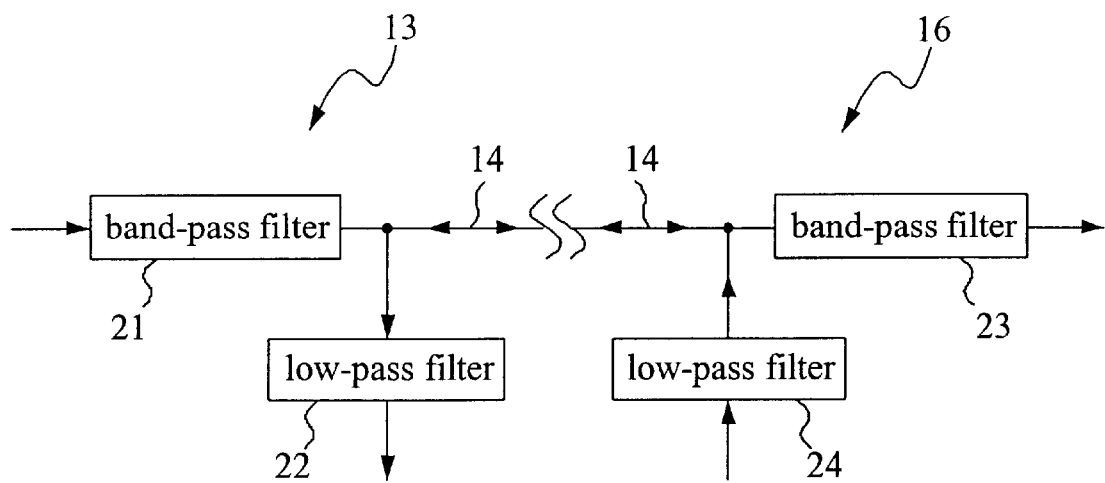
FIG. 2 is a circuit block diagram of a preferred embodiment of the filter module in FIG. 1.
Figure 3:
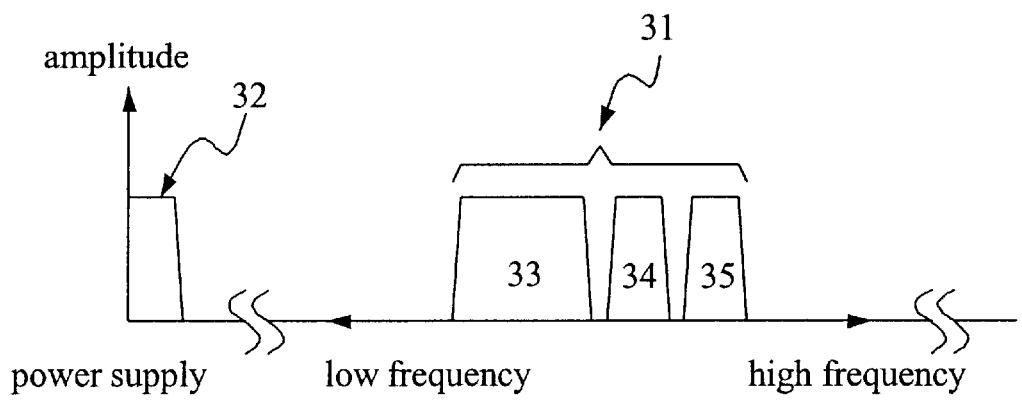
FIG. 3 is a schematic frequency spectrum diagram for the filter module in FIG. 2.

Next, referring to FIG. 2, a circuit block diagram of a preferred embodiment of the filter modules 13 and 16 in FIG. 1 is shown. The filter module 13 includes a band-pass filter 21 and a low-pass filter 22. The filter module 16 includes a band-pass filter 23 and a low-pass filter 24. The band-pass filter 21 and the low-pass filter 22 have different frequency band features, and the band-pass filter 23 and the low pass filter 24 also have different frequency band features. The band-pass filter 21 and the band-pass filter 23 have the same frequency band feature, and the low-pass filter 22 and the low-pass filter 24 also have the same frequency band feature. For example, the band-pass filter 21 and the band-pass filter 23 can have a frequency band 31 as shown in the frequency spectrum diagram of FIG. 3, wherein the frequency bands 33, 34, and 35 can be for the video signal, the audio signal and the control signal, respectively, in the modulated carrier signal, while the low-pass filter 22 and the low-pass filter 24 can have a frequency band 32 for the DC or AC power supply. In this arrangement, with the band-pass filter 21 and the low-pass filter 22, the filter module 13 can separate the modulated carrier signal from the modulator 12 from the power supply from the single cable 14 through different frequency bands, and then output the separated modulated carrier signal and power supply, respectively. With the band-pass filter 23 and the low-pass filter 24, the filter module 16 can separate the modulated carrier signal from the single cable 14 from the external power supply through different frequency bands, and then output the separated modulated carrier signal and power supply, respectively.

Figure 4:
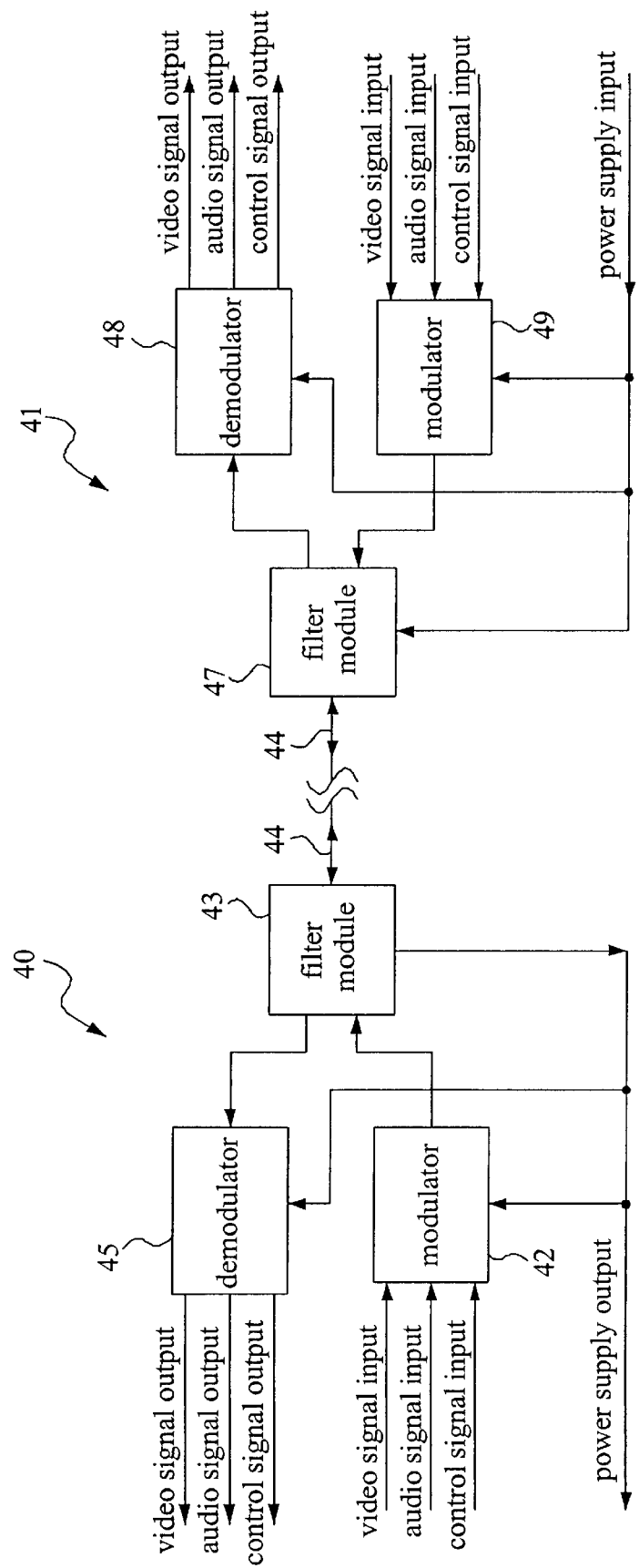
FIG. 4 is a circuit block diagram of the second preferred embodiment of the single-cable transmission device for signals and a power supply of a surveillance system according to the present invention.

FIG. 4 shows a circuit block diagram of the second preferred embodiment of the single-cable transmission device for signals and a power supply of a surveillance system according to the present invention. The second preferred embodiment is based on the single-cable transmission device for signals and a power supply as shown in FIG. 1 which can transmit bi-directional signals together with a power supply. The second preferred embodiment comprises a remote device 40 and a local device 41. The modulator 42 and the filter modulator 43 in the remote device 40, the single cable 44, and the filter module 47 and the demodulator 48 in the local device 41 function as the modulator 12, the filter module 13, the single cable 14, the filter module 16, and the demodulator 17 of FIG. 1, for transforming a set of base band signals inputted externally into a modulated carrier signal, separating the modulated carrier signal from a power supply through different frequency bands, transmitting the separated modulated carrier signal, and then transforming transmitted modulated carrier signal into the set of base band signals. The difference therebetween resides in that the local device 41 further includes a modulator 49 for transforming another set of base band signals into a modulated carrier signal to be separated through different frequency bands by the filter module 47, to be transmitted via the single cable 44, to be separated through different frequency bands by the filter module 43, and to be transformed into the another set of base band signals by a demodulator 45 additionally included in the remote device 40. And, the externally inputted power supply received by the local device 41 is to be separated through different frequency bands by the filter module 47, to be transmitted via the single cable 44, to be separated through different frequency bands by the filter module 43, and to be applied to the modulator 42, the demodulator 45 and external devices.

Figure 5:
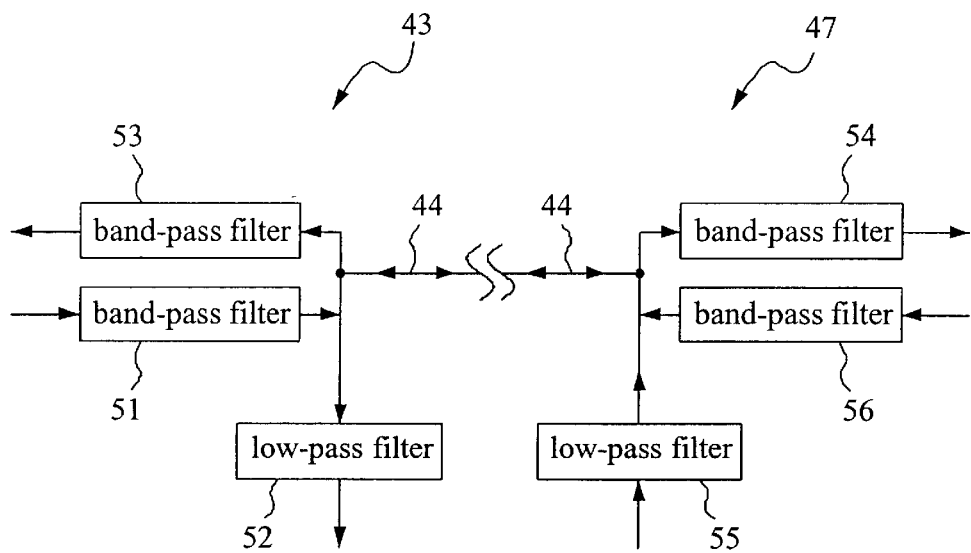
FIG. 5 is a circuit block diagram of a preferred embodiment of the filter module in FIG. 4.
Figure 6:
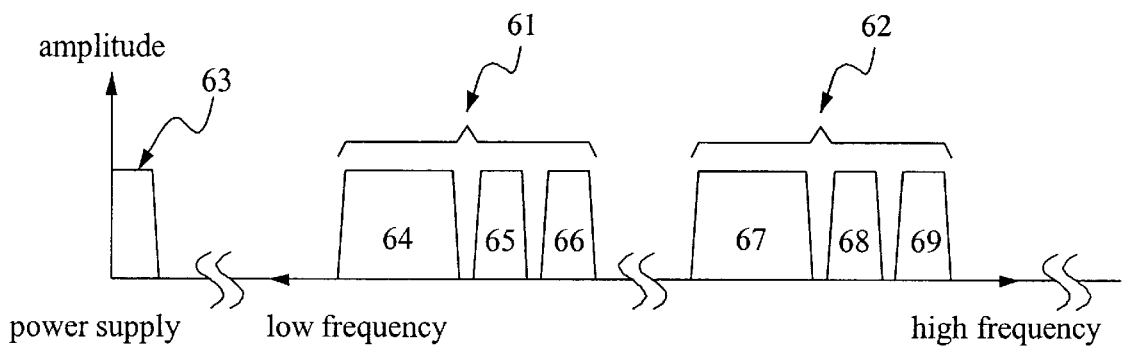
FIG. 6 is a schematic frequency spectrum diagram for the filter module in FIG. 5.

A circuit block diagram of a preferred embodiment of the filter modules 43 and 47 is shown in FIG. 5. The filter module 43 includes a band-pass filter 51 and a low-pass filter 52, as the band-pass filter 21 and the low-pass filter 22 in FIG. 2. The filter module 47 includes a band-pass filter 54 and a low-pass filter 55, as the band-pass filter 23 and the low-pass filter 24 in FIG. 2. The filter module 43 further includes a band-pass filter 53, and the filter module 47 further includes a band-pass filter 56. The band-pass filter 51, and the band-pass filter 53 and the low-pass filter 52 have different frequency band features, and the band-pass filter 54, the band-pass filter 56 and the low-pass filter 55 also have different frequency band features. The band-pass filter 51 and the band-pass filter 54 have the same frequency band feature, the band-pass filter 53 and the band-pass filter 56 have the same frequency band feature, and the low-pass filter 52 and the low-pass filter 55 have the same frequency band feature. For example, the band-pass filter 51 and the band-pass filter 54 can have a frequency band 61 as shown in the frequency spectrum diagram of FIG. 6, wherein the frequency bands 64, 65 and 66 can be for the video signal, the audio signal and the control signal, respectively, in the modulated carrier signal; the band-pass filter 53 and the band-pass filter 56 can have a frequency band 62 as shown in the frequency spectrum diagram of FIG. 6, wherein the frequency bands 67, 68 and 69 can be for the video signal, the audio signal and the control signal, respectively, in the modulated carrier signal; and the low-pass filter 52 and the low-pass filter 55 can have a frequency band 63 for the DC or AC power supply. Thus, the filter modules 43 and 47 can separate the two modulated carrier signals and the power supply from each other through different frequency bands, and then output the separated modulated carrier signals and power supply, respectively.

Figure 7:
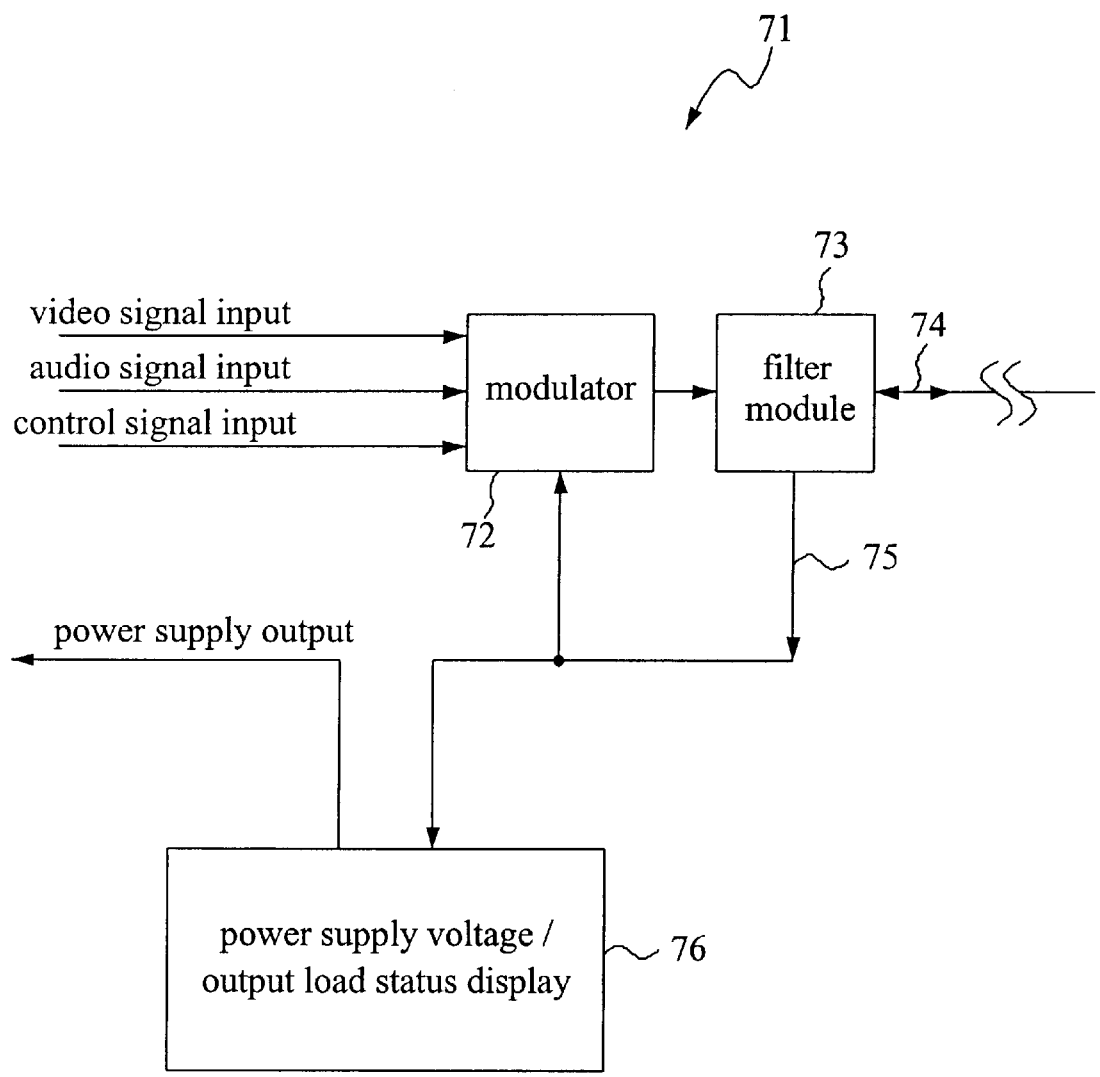
FIG. 7 is a circuit block diagram of the third preferred embodiment of the single-cable transmission device for signals and a power supply of a surveillance system according to the present invention.

FIG. 7 is a circuit block diagram of the third preferred embodiment of the present invention, wherein the remote device 71 includes a modulator 72 and a filter module 73, functioning as the remote device 10 of FIG. 1. A modulated carrier signal and a power supply are respectively transmitted via a single cable 74, and the power supply outputted from the filter module 73 is transmitted on a line 75. The remote device 71 further includes a power-supply-voltage/output-load status display 76 connected between the power supply outputted from the filter module 73 through the line 75 and the external devices for detecting the operation status of the power supply voltage and the external device loads.

Figure 8:
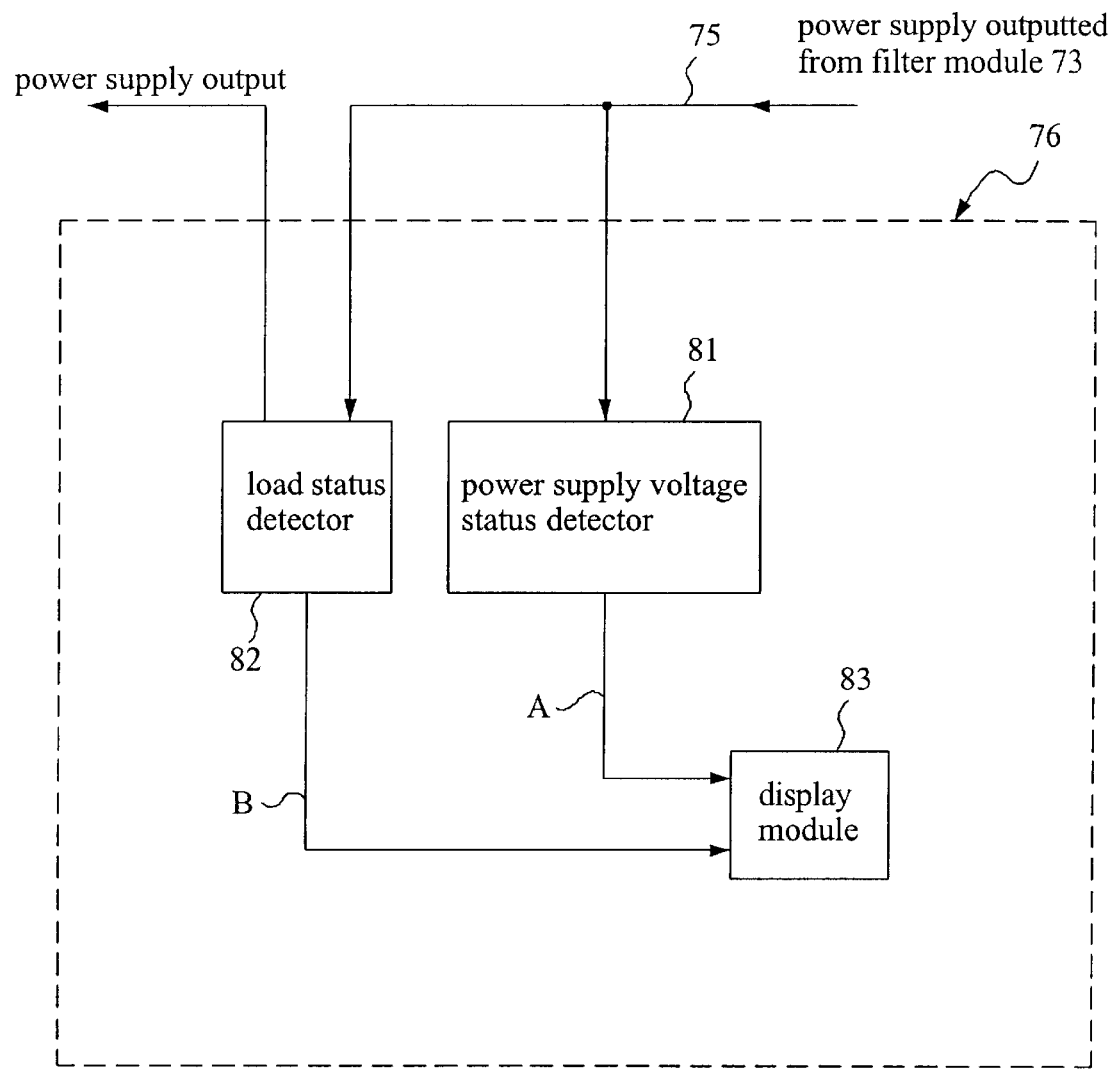
FIG. 8 is a circuit block diagram of a preferred embodiment of the power-supply-voltage/output-load status display in FIG. 7.

FIG. 8 illustrates a circuit block diagram of a preferred embodiment of the power-supply-voltage/output-load status display 76 in FIG. 7, which includes a power-supply-voltage status detector 81, a load status detector 82, and a display module 83. The power-supply-voltage status detector 81 is to detect a status of the voltage of the power supply outputted from the filter module 73 through the line 75, and output on a line A a signal indicative of the status of the power supply voltage. The load status detector 82 is to detect a status of the load of the external devices connected to the power supply outputted from the filter module 73 through the line 75, and output on a line B a signal indicative of the status of the load. The display module 83 is to make a proper manipulation to the signal indicative of the status of the power supply voltage from the line A and to the signal indicative of the status of the load from the line B so as to display the status of the power supply voltage and the load.

Figure 9:
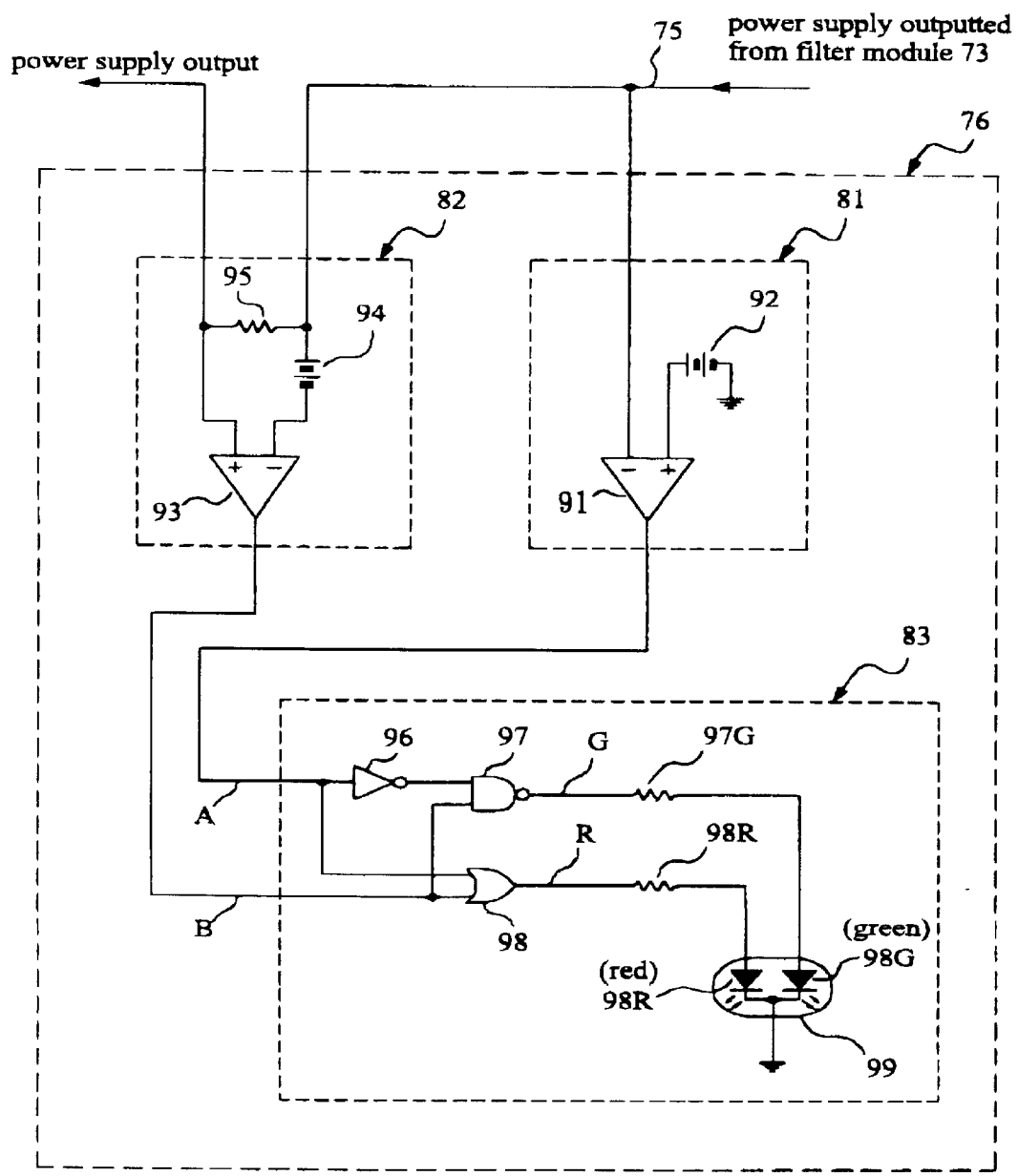
FIG. 9 is a schematic circuit diagram of a preferred embodiment of the circuit block diagram in FIG. 8.

FIG. 9 is a schematic circuit diagram of a preferred embodiment of the circuit block diagram in FIG. 8. As shown in FIG. 9, the power-supply-voltage status detector 81 includes an operational amplified 91 with its positive (+) input pin connected to the positive electrode of a reference voltage 92, and its negative (−) input pin connected to the power supply outputted from the filter module 73 through the line 75. The negative electrode of the reference voltage 92 is grounded. The reference voltage 92 is designed to have a voltage value close to a power supply voltage that enables external devices to work normally. Hence, the operational amplifier 91 can detect the status of the voltage of the power supply outputted from the filter module 73 through the line 75, and output on the line A a signal indicative of the status of the power supply voltage. The load status detector 82 includes an operational amplifier 93 with its negative (−) input pin connected to the negative electrode of a reference voltage 94. The positive electrode of the reference voltage 94 is coupled to the power supply from the line 75 and one end of a resistor 95. The other end of the resistor 95 is coupled to the positive (+) input pin of the operational amplifier 93, and outputs the power supply from the line 75 to external devices. An operation current in external device loads will pass through the resistor 95. The reference voltage 94 is designed to have a voltage value close to a voltage on the resistor 95 caused by the operation current. As a result, the operational amplifier 93 can detect the status of the load of the external devices connected to the power supply outputted from the filter module 73 through the line 75, and output on the line B a signal indicative of the status of the load. The display module 83 includes an inverter 96, a NAND gate 97, or OR gate 98, and LED display 99 and current-limiting resistors 97G and 98R. The LED display 99 consists of a green LED 99G and a red LED 99R. The inverter 96, the NAND gate 97 and the OR gate 98 are together to function as a signal decoder for decoding the signal from the line A indicative of the status of the power supply voltage, and the signal from the line B indicative of the status of the load. The decoded signals indicative of the status of the power supply voltage and the status of the load are outputted on the lines G and R and pass through the current-limiting resistors 97G and 97R, respectively, to cause the green LEd 99G and red LED 99R together to display the status.

Next, the operation principle of the status display 76 in FIG. 9 is further described with reference to the truth table of FIG. 10 as follows:

1. When the power supply is sufficient and there is no load, the operational amplifier 91 outputs a low (L) voltage on the line A, and the operational amplifier 93 also outputs a low (L) voltage on the line B, causing a high (H) voltage on the line G and a low (L) voltage on the line R such that only the green LED 99G is turned on and thus the LED display 99 is in green;

2. When the power supply is sufficient and there is a load, the operational amplifier 91 outputs a low (L) voltage on the line A, and the operational amplifier 93 outputs a high (H) voltage on the line B, causing a low (L) voltage on the line G and a high (H) voltage on the line R such that only the red LED 99R is turned on and thus the LED display 99 is in red;

3. When the power supply is insufficient and there is no load, the operational amplifier 91 outputs a high (H) voltage on the line A, and the operational amplifier 93 outputs a low (L) voltage on the line B, causing a high (H) voltage on the line G and a high (H) voltage on the line R such that the green LED 99G and the red LED 99R are both turned on and thus the LED display 99 is in yellow; and 4. When the power supply is insufficient and there is a load or the load makes the power supply insufficient, the operational amplifier 91 outputs a high (H) voltage on the line A, and the operational amplifier 93 also outputs a high (H) voltage on the line B, causing a high (H) voltage on the line G and a high (H) voltage on the line R such that the green LED 99G and the red LED 99R are both turned on the thus the LED display 99 is in yellow.

In addition, based on the same principle, the embodiments of the single-cable transmission device for signals and a power supply of a surveillance system according to the present invention can apply a power supply at the remote device to the local device.

Please be advised that the transmission devices of the current cable TV system as well as the outdoor down-converter transmission device of the satellite TV receiver also adopt a carrier signal transmission and provide a power supply in the transmission line. However, the cable TV system pertains to a signal transmission in broadcasting form, which has numerous end user devices, and which provides the power supply only for the signal amplifiers on the transmission line rather than for the end user devices. And, the outdoor down-converter transmission device of the satellite TV receiver mainly forms a frequency conversion, and the power supply therein is for use of the outdoor down-converter. Both of the above two transmission devices are different from the present invention.

Although the present invention has been described in detail with reference to the above illustrated embodiments, other modifications, substitutions and changes thereof can be made by one of ordinary skill on the above basis. For example, with a proper signal decoder and LCD display, and display module 83 can display the status of the power supply voltage and the load in a manner of Chinese, English characters or numbers, symbols. Therefore, it is intended to encompass such modifications, substitutions and changes with the scope of the attached claims.

What is claimed is:

1. A single-cable transmission device for signals and a power supply of a surveillance system, comprises a remote device, said remote device having:

a first modulator for transforming a first set of base band signals inputted externally into a first modulated carrier signal; and a first filter module for receiving said first modulated carrier signal and a power supply inputted from said single cable, and separating said first modulated carrier signal from said power supply through different frequency bands, and then outputting said separated first modulated carrier signal and power supply, respectively, wherein said outputted first modulated carrier signal is applied to said single cable.

2. The single-cable transmission device as claimed in claim 1, further comprises a local device, said local device having:

a second filter module for receiving said first modulated carrier signal inputted from said single cable and a power supply inputted externally, and separating said first modulated carrier signal from said power supply through different frequency bands, and then outputting said separated first modulated carrier signal and power supply, respectively, wherein said outputted power supply is applied to said single cable; and a first demodulator for receiving said first modulated carrier signal outputted from said second filter module, and transforming said first modulated carrier signal into said first set of base band signals.

3. The single-cable transmission device as claimed in claim 1, wherein said first filter module of said remote device further receives a second modulated carrier signal inputted from said signal cable, and separates said second modulated carrier signal from said first modulated carrier signal and said power supply through different frequency bands, and then outputs said separated second modulated carrier signal; and said remote device further includes a second demodulator for receiving said second modulated carrier signal outputted from said first filter module, and transforming said second modulated carrier signal into a second set of base band signals.

4. The single-cable transmission device as claimed in claim 3, further comprises a local device, said local device having:

a second modulator for transforming a second set of base band signals inputted externally into a second modulated carrier signal;

a second filter module for receiving said first modulated carrier signal inputted from said single cable, said second modulated carrier signal from said second modulator, and a power supply inputted externally, and separating said first modulated carrier signal, said second modulated carrier signal, and said power supply from each other through different frequency bands and then outputted said separated first modulated carrier signal, second modulated carrier and power supply, respectively, wherein said outputted second modulated carrier signal and power supply are applied to said single cable; and a first demodulator for receiving said first modulated carrier signal outputted from said second filter module and transforming said first modulated carrier signal into said first set of base band signals.

5. The single-cable transmission device as claimed in claim 1, wherein said power supply outputted from said first filter module is applied to said first modulator and external devices.

6. The single-cable transmission device as claimed in claim 2, wherein said first demodulator receives the power supply inputted externally.

7. The single-cable transmission device as claimed in claim 3, wherein said power supply outputted from said first filter module is applied to said first modulator, said second demodulator and external devices.

8. The single-cable transmission device as claimed in claim 4, wherein said first demodulator and said second modulator receive the power supply inputted externally.

9. The single-cable transmission device as claimed in claim 1, wherein said cable is a coaxial cable.

10. The single-cable transmission device as claimed in claim 1, wherein said base band signals includes a video signal, an audio signal and a control signal.

11. The single-cable transmission device as claimed in claim 1, wherein said power supply is a DC power supply.

12. The single-cable transmission device as claimed in claim 1, wherein said power supply is an AC power supply.

13. The single-cable transmission device as claimed in claim 11, wherein said power supply has a voltage range varying with the length of said single cable.

14. The single-cable transmission device as claimed in claim 12, wherein said power supply has a voltage range varying with the length of said single cable.

15. The single-cable transmission device as claimed in claim 12, wherein said power supply outputted from said first filter module is rectified and then applied to said first modulator and external device.

16. The single-cable transmission device as claimed in claim 12, wherein said first demodulator receives said power supply inputted externally after rectified.

17. The single-cable transmission device as claimed in claim 12, wherein said power supply outputted from said first filter module is rectified and then applied to said first modulator, said second demodulator and external device.

18. The single-cable transmission device as claimed in claim 12, wherein said first demodulator and said second modulator receives said power supply inputted externally after rectified.

19. The single-cable transmission device as claimed in claim 1, wherein said modulation is performed in a coherent AM manner.

20. The single-cable transmission device as claimed in claim 19, wherein said demodulation is performed in an AM detection manner.

21. The single-cable transmission device as claimed in claim 1, wherein said modulation is performed in a non-coherent manner, and said modulator is further provided with an adder to integrate modulated carrier signals.

22. The single-cable transmission device as claimed in claim 21, wherein said demodulation is performed with phase-locked loop (PLL).

23. The single-cable transmission device as claimed in claim 1, wherein said first filter module and said second filter module include at least one band-pass filter and one low-pass filter.

24. The single-cable transmission device as claimed in claim 5, further includes a power-supply-voltage/output-load status display connected between the power supply outputted from said first filter module and external devices for detecting the operation status of the power supply voltage and the external device loads.

25. The single-cable transmission device as claimed in claim 24, wherein said power-supply-voltage/output-load status display includes a power-supply-voltage status detector, a load status detector, and a display module.

26. The single-cable transmission device as claimed in claim 25, wherein said power-supply-voltage status detector and said load status detector include at least one operational amplifier and one reference voltage, and said display module includes a single decoder and an LED display.

27. A single-cable transmission device for signals and a power supply of a surveillance system, comprises a remote device, said remote device having:
    a first modulator for transforming a first set of base band signals inputted externally into a first modulated carrier signal; and
    a first filter module for receiving said first modulated carrier signal and a power supply inputted externally, and separating said first modulated carrier signal from said power supply through different frequency bands, and then outputting said separated first modulated carrier signal and power supply to said single cable.

28. The single-cable transmission device as claimed in claim 27, further comprises a local device, said local device having:
    a second filter module for receiving said first modulated carrier signal and said power supply inputted from said single cable, and separating said first modulated carrier signal from said power supply through different frequency bands, and then outputting said separated first modulated carrier signal and power supply, respectively; and
    a first demodulator for receiving said first modulated carrier signal outputted from said second filter module, and transforming said first modulated carrier signal into said first set of base band signals.

29. The single-cable transmission device as claimed in claim 27, wherein said first filter module of said remote device further receives a second modulated carrier signal inputted from said single cable, and separates said second modulated carrier signal from said first modulated carrier signal and said power supply through different frequency bands, and then outputs said separated second modulated carrier signal; and said remote device further includes a second demodulator for receiving and second modulated carrier signal outputted from said first filter module, and transforming said second modulated carrier signal into a second set of base band signals.

30. The single-cable transmission device as claimed in claim 29, further comprises a local device, said local device having:
    a second modulator for transforming a second set of base band signals inputted externally into a second modulated carrier signal;
    a second filter module for receiving said first modulated carrier signal and said power supply inputted from said single cable and said second modulated carrier signal from said second modulator, and separating said first modulated carrier signal, said second modulated carrier signal, and said power supply from each other through different frequency bands, and then outputted said separated first modulated carrier signal, second modulated carrier and power supply, respectively, wherein said outputted second modulated carrier signal is applied to said single cable; and
    a first demodulator for receiving said first modulated carrier signal outputted from said second filter module and transforming said first modulated carrier signal into said first set of base band signals.

31. The single-cable transmission device as claimed in claim 27, wherein said first modulator receives said power supply inputted externally.

32. The single-cable transmission device as claimed in claim 28, wherein said power supply outputted from said second filter module is applied to said first demodulator and external devices.

33. The single-cable transmission device as claimed in claim 29, wherein said first modulator and said second demodulator receive said power supply inputted externally.

34. The single-cable transmission device as claimed in claim 30, wherein said power supply outputted from said second filter module is applied to said first demodulator, said second modulator and external devices.

35. The single-cable transmission device as claimed in claim 27, wherein said cable is a coaxial cable.

36. The single-cable transmission device as claimed in claim 27, wherein said base band signals includes a video signal, an audio signal and a control signal.

37. The single-cable transmission device as claimed in claim 27, wherein said power supply is a DC power supply.

38. The single-cable transmission device as claimed in claim 27, wherein said power supply is an AC power supply.

39. The single-cable transmission device as claimed in claim 37, wherein said power supply has a voltage range varying with the length of said single cable.

40. The single-cable transmission device as claimed in claim 38, wherein said power supply has a voltage range varying with the length of said single cable.

41. The single-cable transmission device as claimed in claim 38, wherein said first modulator receives said power supply inputted externally after rectified.

42. The single-cable transmission device as claimed in claim 38, wherein said power supply outputted from said second filter module is rectified and then applied to said first demodulator and external devices.

43. The single-cable transmission device as claimed in claim 38, wherein said first modulator and said second demodulator receive said power supply inputted externally after rectified.

44. The single-cable transmission device as claimed in claim 38, wherein said power supply outputted from said second filter module is rectified and then applied to said first demodulator, said second modulator and external devices.

45. The single-cable transmission device as claimed in claim 27, wherein said modulation is performed in a coherent AM manner.

46. The single-cable transmission device as claimed in claim 45, wherein said demodulation is performed in an AM detection manner.

47. The single-cable transmission device as claimed in claim 27, wherein said modulation is performed in a non-coherent manner, and said modulator is further provided with an adder to integrate modulated carrier signals.

48. The single-cable transmission device as claimed in claim 47, wherein said demodulation is performed with phase-locked loop (PLL).

49. The single-cable transmission device as claimed in claim 27, wherein said first filter module and said second filter module include at least one band-pass filter and one low-pass filter.

50. The single-cable transmission device as claimed in claim 32, further includes a power-supply-voltage/output-load status display connected between the power supply outputted from said second filter module and external devices for detecting the operation status of the power supply voltage and the external device loads.

51. The single-cable transmission device as claimed in claim 50, wherein said power-supply-voltage/output-load status display includes a power-supply-voltage status detector, a load status detector, and a display module.

52. The single-cable transmission device as claimed in claim 51, wherein said power-supply-voltage status detector and said load status detector include at least one operational amplifier and one reference voltage, and said display module includes a single decoder and an LED display.

\* \* \* \* \*